(12) United States Patent
Qi et al.

(10) Patent No.: US 11,363,519 B2
(45) Date of Patent: Jun. 14, 2022

(54) METHOD FOR SELECTING PARENT NODE IN MESH NETWORK

(71) Applicant: Espressif Systems (Shanghai) Co., Ltd., Shanghai (CN)

(72) Inventors: Yuexia Qi, Shanghai (CN); Jiangjian Jiang, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/623,702

(22) PCT Filed: Dec. 4, 2018

(86) PCT No.: PCT/CN2018/119029
§ 371 (c)(1),
(2) Date: Dec. 17, 2019

(87) PCT Pub. No.: WO2019/128635
PCT Pub. Date: Jul. 4, 2019

(65) Prior Publication Data
US 2021/0014770 A1    Jan. 14, 2021

(30) Foreign Application Priority Data
Dec. 29, 2017    (CN) .......................... 201711469959.X

(51) Int. Cl.
*H04W 4/00*      (2018.01)
*H04W 40/32*     (2009.01)
(Continued)

(52) U.S. Cl.
CPC .......... *H04W 40/32* (2013.01); *H04B 17/318* (2015.01); *H04W 24/04* (2013.01); *H04W 84/12* (2013.01); *H04W 84/18* (2013.01)

(58) Field of Classification Search
CPC ......... H04L 45/02; H04L 45/04; H04L 45/22; H04L 45/48; H04L 47/125; H04W 84/18; H04W 88/14; H04W 40/34
See application file for complete search history.

(56) References Cited

U.S. PATENT DOCUMENTS

| 2007/0132846 A1* | 6/2007 | Broad ................. G08B 25/009 348/143 |
| 2015/0249548 A1* | 9/2015 | Rasband ............... H04W 24/02 370/254 |
| 2018/0234320 A1* | 8/2018 | Paulraj .............. H04W 28/0268 |

FOREIGN PATENT DOCUMENTS

| CN | 101959054 | 1/2011 |
| CN | 103415018 | 11/2013 |

(Continued)

OTHER PUBLICATIONS

Wang Zhendong; Design and Implementation of BitCloud-based Wireless Monitoring Network Software; 2014; 64 pages.
(Continued)

*Primary Examiner* — Khalid W Shaheed
(74) *Attorney, Agent, or Firm* — Reinhart Boerner Van Deuren P.C.

(57) ABSTRACT

The invention provides a method for selecting a parent node in a mesh network: for one or more other nodes found through scanning, a first node filtering out, from the one or more other nodes, nodes that are not in a same organization, not of a same version, or not in the same network; filtering out, from the one or more other nodes, leaf child nodes at a deepest level, and nodes with a maximum number of connections reached; filtering out, from the one or more other nodes, free nodes, all child nodes of the first node, and nodes in a looped list of the first node; filtering out, from the one or more other nodes, nodes with a signal strength unable to maintain normal communication; and according to preset (Continued)

weights, for each of remaining nodes in the one or more other nodes after filtering, calculating a rank collectively based on a signal strength value of the node, a level of the node, and an existing number of connections of the node, and selecting a node with a highest rank among the remaining nodes as the parent node of the first node. The invention may rapidly and effectively establish parent-child relationships between nodes in the mesh network, optimize the network topology structure, and improve the communication quality between the nodes.

14 Claims, 2 Drawing Sheets

(51) Int. Cl.
*H04B 17/318* (2015.01)
*H04W 24/04* (2009.01)
*H04W 84/12* (2009.01)
*H04W 84/18* (2009.01)

(56) References Cited

FOREIGN PATENT DOCUMENTS

| | | |
|---|---|---|
| CN | 103796272 | 5/2014 |
| CN | 104066072 | 9/2014 |
| CN | 106255134 | 12/2016 |
| CN | 106604344 | 4/2017 |
| CN | 108156644 | 6/2018 |
| WO | WO 02/093802 | 11/2002 |

OTHER PUBLICATIONS

Linlin Wang; Design and Implementation of Intelligent Lighting Monitoring System Based on 6LoWPAN; 2016; 64 pages.
Wu San-Zhu et al.; Based on energy awareness CTP routing algorithm for wireless sensor networks; 2014; 4 pages.
Xiao Chun-Jing et al.; Low-Interference Multicast in Wireless Mesh Networks; 2013; 15 pages.

* cited by examiner

METHOD FOR SELECTING PARENT NODE IN MESH NETWORK

TECHNICAL FIELD

The invention relates to a Wi-Fi mesh network, particularly to a method for selecting a parent node in a mesh network.

BACKGROUND ART

A Wi-Fi mesh network is a wireless mesh network containing multi-hop wireless links, and network devices therein are called nodes, which form parent-child node relationships according to the level of the each node in the mesh network, thereby realizing forwarding data to each other; a root node services as an exit of the mesh network, which may be connected to the internet via a router, and in turn communicates with external devices.

Taking a tree-structured mesh network as shown in FIG. 1 as an example, child nodes B, C, and D of a root node A are sibling nodes of each other; the node B has a child node E; the node C has a child node F; and the node F has child nodes G and H; here, the nodes B, C, and F are intermediate nodes; the nodes D, E, G, and H are all leaf child nodes without any child node; and a node I is a free node not connected to the network yet.

If a parent node fails, all the child nodes in its subnet may not operate properly. In addition, a wireless environment may be subject to transient changes, and the nodes may be arbitrarily added or removed and may be in motion, such that the network topology structure may change frequently, and thus, in order to rapidly obtain more reliable communication links, an effective mechanism for selecting a parent node is strongly needed.

SUMMARY OF THE INVENTION

An object of the invention is to provide a method for selecting a parent node in a mesh network, which may effectively establish the parent-child relationships between nodes, optimize the network topology structure, and improve the quality of communication between the nodes.

In order to achieve the above object, a technical solution of the invention provides a method for selecting a parent node in a mesh network:

a first node is an arbitrary node, which performs the following operations on one or more other nodes found through scanning, the operations comprising filtering out, from the one or more other nodes, nodes that are not in a same organization, not of a same version, or not in the same network;

filtering out, from the one or more other nodes, leaf child nodes at a deepest level, and nodes with a maximum number of connections reached;

filtering out, from the one or more other nodes, free nodes, all child nodes of the first node, and nodes in a looped list of the first node;

filtering out, from the one or more other nodes, nodes with a signal strength unable to maintain normal communication; and according to preset weights, for each of remaining nodes in the one or more other nodes after filtering, calculating a rank collectively based on a signal strength value of the node, a level of the node, and an existing number of connections of the node, and selecting a node with a highest rank among the remaining nodes as the parent node of the first node.

Preferably, the first node obtains a factor value of each of the one or more other nodes through communication with the one or more other nodes, and performs the operations of filtering according to the factor value.

Preferably, the factor value is recorded in an information element of a management frame sent by each of the one or more other nodes.

Preferably, the factor value of each of the one or more other nodes respectively comprises a corresponding network OUI, a network version, and a network ID; and by comparing the network OUI, the network version, and the network ID of the first node and those of each of the one or more other nodes, the first node filters out, from the one or more other nodes, nodes that are not in the same organization, not of the same version, or not in the same network.

Preferably, the factor value of each of the one or more other nodes respectively comprises a corresponding node type; and the first node filters out, from the one or more other nodes, leaf child nodes that do not support SoftAP mode.

Preferably, the factor value of each of the one or more other nodes respectively comprises a corresponding deepest level supported by the node and a current level of the node; and the first node filters out, from the one or more other nodes, nodes with the current level of the node being equal to the deepest level.

Preferably, the factor value of each of the one or more other nodes respectively comprises a corresponding node type; and when there is a root node in the network, the first node filters out a router configured by the root node.

Preferably, a signal strength threshold is provided according to a range of signal strengths capable of maintaining normal communication;

the first node filters out, from the one or more other nodes, nodes with an actual signal strength value lower than the signal strength threshold;

wherein the actual signal strength value of each of the one or more other nodes is any of or any combination of:

"a signal strength value between the node and the router" included in the factor value of each of the one or more other nodes;

"a signal strength value between the node and its parent node" included in the factor value of each of the one or more other nodes; and the signal strength value of each of the one or more other nodes when communicating with the first node.

Preferably, the signal strength threshold is a multi-level threshold with gradient;

when the actual signal strength values of all the one or more other nodes are lower than a currently configured level of threshold, the threshold is progressively decreased according to the gradient, and is compared with the actual signal strength values again; until when there is any of the actual signal strength values of the one or more other nodes is higher than the decreased signal strength threshold, a node with a highest signal strength value is selected as the parent node.

Preferably, the signal strength value of each the one or more other nodes remained after filtering is any of or any combination of:

"signal strength values of the node and its parent node" included in the factor value of each of the one or more other nodes;

"the level of the node and the existing number of connections of the node" included in the factor value of each of the one or more other nodes; and the signal strength value of each of the one or more other nodes when communicating with the first node.

DETAILED DESCRIPTION OF THE PREFERRED EMBODIMENTS

The invention provides a method for selecting a parent node in a mesh network. An arbitrary node in the mesh network may place its own corresponding influence factor in an information element (IE, Information Element) of a management frame, e.g., a beacon or a probe response, for sending.

The influence factor may include any factor value, or any combination thereof, as illustrated below:

A network OUI (Organization Unique Identifier); a network version; network ID; a node type (root node, intermediate node, leaf child node, or free node); a deepest level supported by the node and a current level of the node; a maximum number of connections supported by the node and a current number of connections of the node; a signal strength value between the node and the router; a signal strength value between the node and its parent node; and a number of nearby nodes found through scanning by the node.

Figure 1:
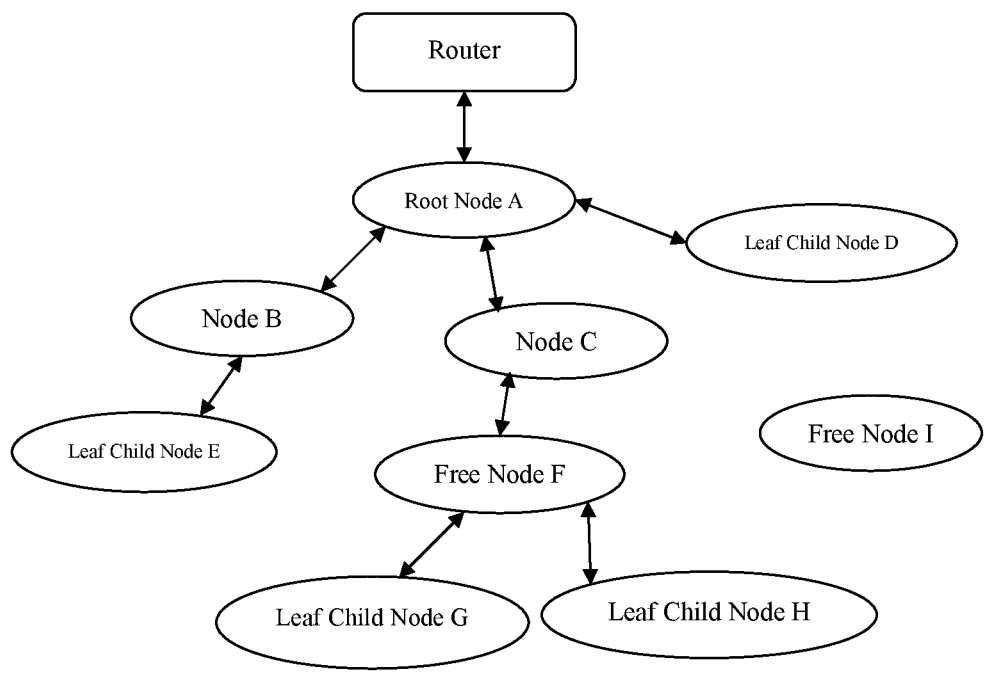
FIG. 1 is an illustrative diagram of a mesh network according to one embodiment.
Figure 2:
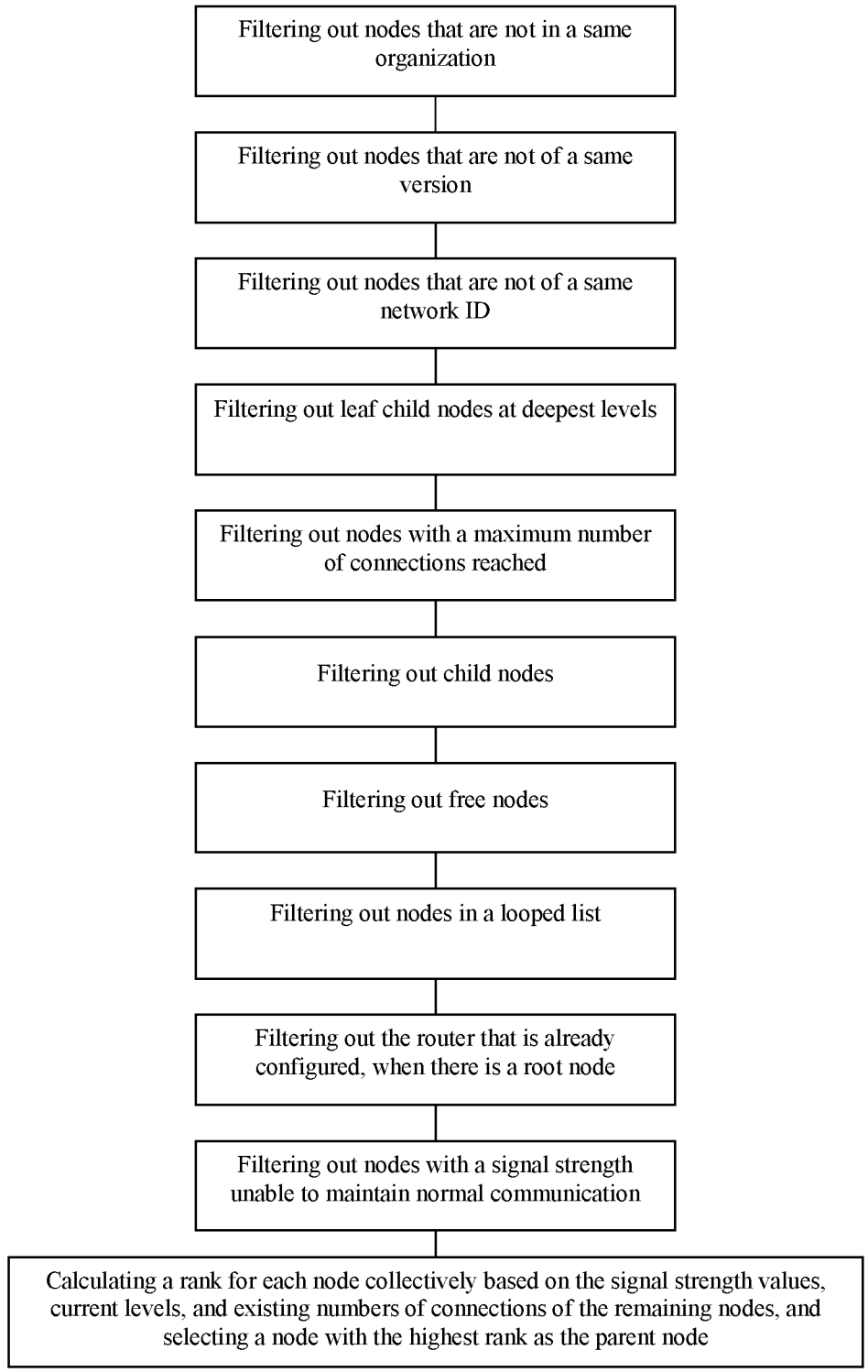
FIG. 2 is a flow chart of a method for selecting a parent node in a mesh network according to an embodiment of the invention.

As shown in FIG. 2, for example when provisioning the mesh network, after an arbitrary node (referred to as "the current node" hereinafter) completes scanning, one or more other nodes found through scanning are all considered as candidates for the parent node; and factor values obtained from the management frames of these other nodes are correspondingly processed, for example:

S1) the current node compares the network OUI contained in the factor value with its own network OUI, and filters out other nodes with inconsistent network OUI, i.e., not in the same organization. The network OUI may be the 24 leading bits of the MAC address for distinguishing different vendors.

S2) the current node compares the network version contained in the factor value with its own network version, and filters out those other nodes not of the same version. Nodes from different organizations or of different versions may be inflicted by firmware compatibility problem, and thus are removed from the candidate nodes for the parent node.

S3) the current node compares the network ID contained in the factor value with its own network ID, and filters out other nodes that are not in the same network. The network ID may be used to distinguish different networks, such that nodes configured with different network IDs may enter different networks correspondingly. It improves the security to filter out nodes not in the same network.

S4) the current node filters out, from the one or more other nodes found through scanning, leaf child nodes at the deepest level; for this purpose, the filtering shall be based on the node type contained in the factor value, the deepest level supported by the node, and the current level of the node.

If the node type of a certain other node is determined to be a leaf child node, then the leaf child node may be a node that does not support "SoftAP" mode, i.e., a node without the capability to extend the network, and so this node may not serve as the parent node in spite of which level the node is in the network.

The deepest level refers to a level of a maximum depth of allowed by the network; a certain node being at the deepest level means the node is at an edge of the network, so even if it has the capability to extend the network, it is not allowed to be connected by more devices and may not act as a parent node. Thus, if the current level of a certain other node is determined to be the deepest level, this node will be filtered out.

S5) the current node filters out, from the one or more other nodes found through scanning, nodes with a maximum number of connections reached; for this purpose, filtering shall be based on "the maximum number of connections supported by the node and the current number of connections of the node" contained in the factor value. If it is determined that the current number of connections of the node is equal to the maximum number of connections supported thereby, this node will be filtered out.

S6) the current node filters out, from the one or more other nodes found through scanning, its own child nodes.

S7) the current node filters out, from the one or more other nodes found through scanning, free nodes that has not joined the network, by determining the node type contained in the factor value.

S8) the current node filters out, from the one or more other nodes found through scanning, nodes in the loop list of the current node. After entering the loop, broadcast messages in the network may be perpetually forwarded and broadcasted in an endless loop, thereby causing broadcast storm in the network to exhaust the memory resources and paralyze the system; thus, such a loop shall be prohibited in the network. Usually, after a loop node is detected according to a path verification mechanism, the loop node will be recorded in the loop list, so as to avoid loop connection.

S9) if there is already a root node in the network, the current node filters out, from the candidates for the parent node, the router that is already configured. Each node device may compete to be the root node upon initialization, and selects the router as its parent node; however, once the root node is determined, all the other nodes shall abandon the router to select the new parent node.

S10) the current node filters out, from the one or more other nodes found through scanning, nodes with a signal strength unable to maintain normal communication. The signal strength capable of maintaining normal communication may be an empirical value, based on which a signal strength threshold may be provided; and if the signal strength values of the nodes found through scanning are determined to be higher than the threshold, these nodes may serve as the candidate nodes for the parent node, otherwise these nodes will be filtered out.

The signal strength value for the determination may be "the signal strength value between the node and the router" and/or "the signal strength value between the node and its parent node" contained in the corresponding factor value of each of the other nodes; or, it may also be the signal strength value between the current node and these nodes obtained when the current node performs scanning, according to the conditions when receiving the management frames from the other nodes.

S11) For the remaining nodes in the other nodes after being filtered through S1-S10, corresponding weights may be provided, and a rank is calculated for each of the remaining nodes collectively based on "the signal strength value between the node and its parent node" of each remaining node, the signal strength value between each remaining node and the current node, and "the current level of the node and the existing number of connections of the node" of each remaining node; the higher the rank, the more suitable for a node to act as the parent node. At this point, the parent node is selected from the one or more other nodes found through scanning by the current node.

As examples, a remaining node with higher signal strength value, upper current level of the node, or smaller existing number of connections may be selected as the parent node. It shall be noted that the processing order of items S1-S10 of the invention are not limited to the order as illustrated.

In addition, in some embodiments of S11, if there is no selectable parent node with a signal strength higher than the signal strength threshold, the signal strength threshold may be decreased according to a certain gradient, until there is a node with a signal strength higher than the threshold and with a strongest signal strength, which will be selected as the parent node.

Although the content of the present invention is described in detail through the above described preferred embodiments, it shall be understood that the above description should not be considered as limiting the present invention. After reviewing the above content, various modification and substitution to the present invention will become apparent to a person skilled in the art. Thus, the scope of protection of the present invention shall be defined by the appended claims.

The invention claimed is:

1. A method for selecting a parent node in a Wi-Fi mesh network, wherein the Wi-Fi mesh network includes a router for nodes in the Wi-Fi mesh network being connected to internet, wherein a first node is an arbitrary node, when there is a root node in the Wi-Fi mesh network, the first node filters out the router configured by the root node and further performs the following operations on one or more other nodes found through scanning to select a parent node, the operations comprising the steps of:
   filtering out, from the one or more other nodes, nodes that are not in a same organization, not of a same version, or not in the same network;
   filtering out, from the one or more other nodes, leaf child nodes at a deepest level, and nodes with a maximum number of connections reached;
   filtering out, from the one or more other nodes, free nodes, all child nodes of the first node, and nodes in a looped list of the first node;
   filtering out, from the one or more other nodes, nodes with a signal strength unable to maintain normal communication, wherein a signal strength threshold is provided according to a range of signal strengths capable of maintaining normal communication; the first node filters out, from the one or more other nodes, nodes with an actual signal strength value lower than the signal strength threshold; wherein the actual signal strength value of each of the one or more other nodes is any of or any combination of:
   a signal strength value between the node and the router;
   a signal strength value between the node and its parent node; and the signal strength value of each of the one or more other nodes when communicating with the first node; and
   according to preset weights, for each of remaining nodes in the one or more other nodes after the steps of filtering, calculating a rank collectively based on a signal strength value of the node, a level of the node, and an existing number of connections of the node, and selecting a node with a highest rank among the remaining nodes as the parent node of the first node.

2. The method for selecting a parent node in a Wi-Fi mesh network according to claim 1, wherein the first node obtains a factor value of each of the one or more other nodes through communication with the one or more other nodes, and performs the operations of filtering according to the factor value.

3. The method for selecting a parent node in a Wi-Fi mesh network according to claim 2, wherein the factor value is recorded in an information element of a management frame sent by each of the one or more other nodes.

4. The method for selecting a parent node in a Wi-Fi mesh network according to claim 2, wherein the factor value of each of the one or more other nodes respectively comprises a corresponding network OUI, a network version, and a network ID; and by comparing the network OUI, the network version, and the network ID of the first node and those of each of the one or more other nodes, the first node filters out, from the one or more other nodes, nodes that are not in the same organization, not of the same version, or not in the same network.

5. The method for selecting a parent node in a Wi-Fi mesh network according to claim 2, wherein the factor value of each of the one or more other nodes respectively comprises a corresponding node type; and the first node filters out, from the one or more other nodes, leaf child nodes that do not support SoftAP mode.

6. The method for selecting a parent node in a Wi-Fi mesh network according to claim 2, wherein the factor value of each of the one or more other nodes respectively comprises a corresponding deepest level supported by the node and a current level of the node; and the first node filters out, from the one or more other nodes, nodes with the current level of the node being equal to the deepest level.

7. The method for selecting a parent node in a Wi-Fi mesh network according to claim 2, wherein the factor value of each of the one or more other nodes respectively comprises a corresponding node type.

8. The method for selecting a parent node in a Wi-Fi mesh network according to claim 1, wherein the signal strength threshold is a multi-level threshold with gradient;
   when the actual signal strength values of all the one or more other nodes are lower than a currently configured level of threshold, the threshold is progressively decreased according to the gradient, and is compared with the actual signal strength values again; until when there is any of the actual signal strength values of the one or more other nodes is higher than the decreased signal strength threshold, a node with a highest signal strength value is selected as the parent node.

9. The method for selecting a parent node in a Wi-Fi mesh network according to claim 2, wherein the signal strength value of each the one or more other nodes remained after filtering is any of or any combination of:
   "signal strength values of the node and its parent node" included in the factor value of each of the one or more other nodes;
   "the level of the node and the existing number of connections of the node" included in the factor value of each of the one or more other nodes; and
   the signal strength value of each of the one or more other nodes when communicating with the first node.

10. The method for selecting a parent node in a Wi-Fi mesh network according to claim 3, wherein the factor value of each of the one or more other nodes respectively comprises a corresponding network OUI, a network version, and a network ID;

and by comparing the network OUI, the network version, and the network ID of the first node and those of each of the one or more other nodes, the first node filters out, from the one or more other nodes, nodes that are not in the same organization, not of the same version, or not in the same network.

11. The method for selecting a parent node in a Wi-Fi mesh network according to claim 3, wherein the factor value of each of the one or more other nodes respectively comprises a corresponding node type; and the first node filters out, from the one or more other nodes, leaf child nodes that do not support SoftAP mode.

12. The method for selecting a parent node in a Wi-Fi mesh network according to claim 3, wherein the factor value of each of the one or more other nodes respectively comprises a corresponding deepest level supported by the node and a current level of the node; and the first node filters out, from the one or more other nodes, nodes with the current level of the node being equal to the deepest level.

13. The method for selecting a parent node in a Wi-Fi mesh network according to claim 3, wherein the factor value of each of the one or more other nodes respectively comprises a corresponding node type.

14. The method for selecting a parent node in a Wi-Fi mesh network according to claim 3, wherein the signal strength value of each the one or more other nodes remained after filtering is any of or any combination of:

"signal strength values of the node and its parent node" included in the factor value of each of the one or more other nodes;

"the level of the node and the existing number of connections of the node" included in the factor value of each of the one or more other nodes; and the signal strength value of each of the one or more other nodes when communicating with the first node.

* * * * *